ically rising and lowering of the prime mover, as it traverses uneven ground, without causing a trailer coupled thereto to follow every excursion in elevation, and thus avoids the introduction of inordinate tensional and shear forces on the coupling pintle.

United States Patent
Masar

[15] 3,659,875
[45] May 2, 1972

[54] PINTLE ASSEMBLY

[72] Inventor: Joseph M. Masar, Boonton Avenue, Boonton-Taylortown, N.J. 07005

[22] Filed: Aug. 10, 1970

[21] Appl. No.: 62,253

[52] U.S. Cl. .................................................. 280/477
[51] Int. Cl. .................................................. B62d 53/00
[58] Field of Search .................. 280/446, 498, 491, 477

[56] References Cited

UNITED STATES PATENTS

| 3,565,461 | 2/1971 | Jones | 280/498 |
| 2,600,959 | 6/1952 | Bender | 280/498 |
| 2,889,155 | 6/1959 | Sandage | 280/491 B |
| 3,117,805 | 1/1964 | Schoeffler | 280/491 B |
| 1,608,722 | 11/1926 | Clark | 280/498 |

*Primary Examiner*—Benjamin Hersh
*Assistant Examiner*—Robert R. Song
*Attorney*—Bernard J. Murphy

[57] ABSTRACT

For a trailer coupling hitch, this assembly, in combination with a wheeled prime mover, presents a pivotal platform from which the pintle extends. The pivotability of the platform facilitates incident rising and lowering of the prime mover, as it traverses uneven ground, without causing a trailer coupled thereto to follow every excursion in elevation, and thus avoids the introduction of inordinate tensional and shear forces on the coupling pintle.

7 Claims, 6 Drawing Figures

Patented May 2, 1972 3,659,875

INVENTOR
JOSEPH M. MASAR
BY
Bernard J. Murphy
AGENT

PINTLE ASSEMBLY

This invention pertains to pintle assemblies, and in particular to such assemblies, for a trailer coupling hitch, used in combination with a wheeled prime mover.

Pintle assemblies known in the prior art are rigidly fixed to the rear of prime movers. Accordingly, as the prime mover is caused to transverse uneven ground—as when such mover must negotiate a curb, to enter a construction site, for instance—the rigid pintle assembly must actually lift the trailer coupled thereto. This weighting of the pintle strains it heavily, and often it will snap or shear.

To a avoid this problem, some prior art pintle assemblies support the pintle at the rear of the prime mover in mountings which accommodate oscillation of the pintle about one or more axis. However, the known oscillatable pintles are carried high above the axis of the wheels of the prime mover. Thus, with the raised mounting and axial movement, these pintle assemblies invite a roll-over of the trailer. Also, the known pintle assemblies comprise vertically extending—and usually depending—pintles which lack a pintle-mounting platform useful for sliding engagement therewith by the trailer hitch to facilitate a "finding" of the pintle by the hitch.

It is an object of this invention to teach a pintle assembly which improves over the known types. It is especially an object of this invention to set forth a new pintle assembly having platform means depending from the prime mover, for slidably receiving a trailer coupling hitch thereupon, said platform means having a pintle secured thereto for engagement by such hitch.

A feature of this invention comprises the use of a platform which is pivotally mounted to a depending support of the prime mover, the platform pivotal axis being lower than the axis of rotation of the prime mover wheels.

Further objects and features of this invention will become more apparent by reference to the following description taken in conjunction with the accompanying figures, in which.

Figure 3:
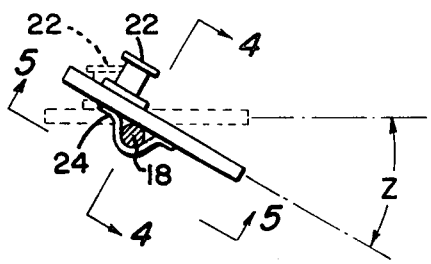
FIG. 3 is a side view of the inventive pintle assembly of FIG. 2.
Figure 4:
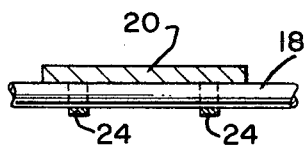
Figure 5:
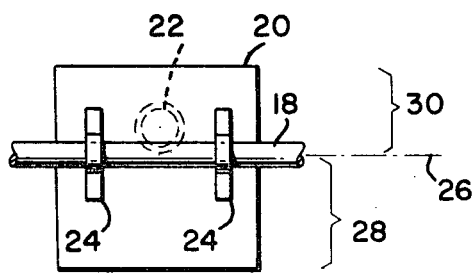
Figure 6:
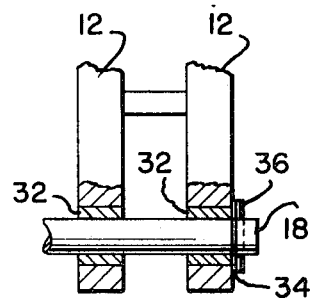

FIG. 4 is an axial cross-sectional view of the pintle assembly, according to the invention, in which the pivotal shaft is shown in full illustration; FIG. 5 is a bottom view of the novel pintle assembly, taken along section 5—5 of FIG. 3; and FIG. 6 is horizontal cross-sectional view of the inventive pintle assembly, taken along section 6—6 of FIG. 2, with the pivotal shaft shown in full illustration.

Figure 1:
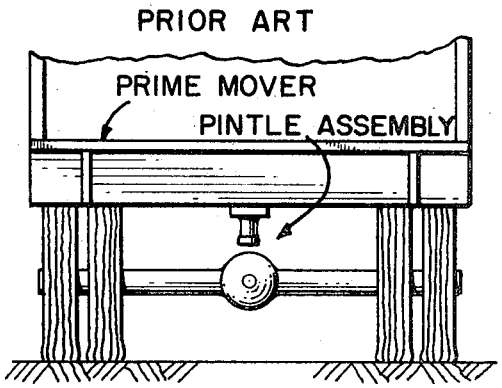
FIG. 1 is a vertical illustration of the prior art pintle assemblies in which the pintle disposed for coupling of a trailer rigidly depends from the bottom of the bed-frame of a prime mover.

As FIG. 1 illustrates, the prior art pintle assemblies comprise a pintle depending from the rear bed-frame of a prime mover, the pintle being rigidly secured thereto. Thus, as the prime mover moves into declivities, and climbs obstructions and rises, the depending pintle necessarily follows the elevational excursions of the prime mover. A trailer attached to said pintle can do none else than execute the very same elevational excursions. As a consequence, the forward end of the trailer, at least, brings its full weight to bear upon the pintle. When the prime mover is negotiating a given obstruction, such as a curb, the prime mover—in effect—must "carry" the forward end of the trailer, lifting the same from the road bed over the curb.

As shown in FIGS. 2 through 6, my inventive pintle assembly avoids the disadvantages obtaining with the prior art assemblies. According to my invention, the novel pintle assembly 10 is carried by parallel members 12 which depend from the bed frame 14 of the prime mover 16. Members 12 are rigidly fixed to the bed frame, and receive either ends of a rotatable shaft 18 to which is fixed a platform 20. A pintle 22 is secured to, and projects perpendicularly from the platform for coupling of a trailer hitch thereto.

FIG. 3 shows that the platform 20 is mounted to the shaft 18 by a pair of U-shaped straps (only one of which is illustrated). Straps 24 are formed of steel or the like, and are welded or otherwise fixed to both the platform 20 and the shaft 18, in this embodiment of the invention.

The axial view presented by FIG. 4 shows both of the straps 24, fixed to the platform 20 and shaft 18, however, it is to be understood that in alternative embodiments of the invention a greater or lesser number of such straps can be used. Also, others will find differing methods of unitizing the platform 20 and shaft 18, which methods may or may not warrant the use of such straps; yet, all such practices are considered to be comprised by the teaching of my disclosure.

From the bottom view of the novel pintle assembly of my invention, shown in FIG. 5, it can be more readily seen that the pintle 22, extending from the uppersurface of the platform 20, is offset from the rotary or pivotal axis 26 of shaft 18. This offset disposition of the pintle 22 provides an orbiting of the pintle 22 about the axis 26 which effects or accommodates a lowering of the pintle below said axis, and an elevation thereof above said axis. The slewing of the pintle 22, about the axis 26 from a normal tow—where the platform and pintle are shown in broken line, and a tow in which the prime mover has executed a climb in elevation, as shown in solid line—is presented in FIG. 3. The pintle 22 slews or orbits about the axis 26 of shaft 18 defining the arc Z for this limited movement. Clearly though, it can be appreciated that, if the prime mover were to descend into a declivity, the platform and pintle would slew or orbit in the alternate direction, and the pintle would proceed to move below the axis 26. Thus, while the prime mover 16 manouvers over rising and falling ground environment, the pintle 22, platform 20, and the coupled trailer can accommodate for the elevational excursions.

Figure 2:
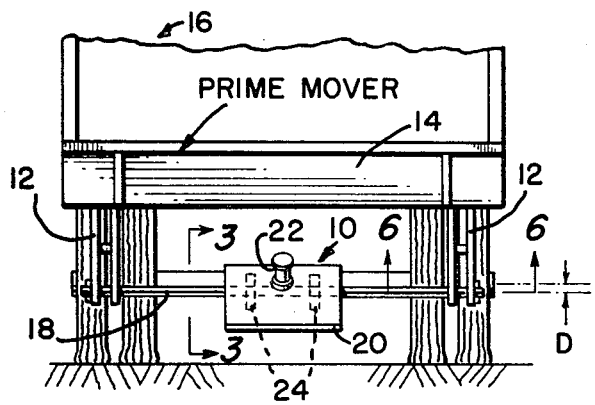
FIG. 2 is a vertical illustration of the rear of a prime mover having the novel pintle assembly, according to the invention, pivotally mounted, dependingly, from the rear of a prime mover.

The trailing portion 28 of the platform 20, as compared to the leading portion 30, as shown in FIG. 5, is the greater in size and weight. For this reason, the platform normally inclines diagonally, as illustrated in FIGS. 2 and 3. This inclination facilitates the coupling hook-up of the trailer; the prime mover 16 is backed toward the trailer coupling hitch, the latter engaging the platform 20 and sliding thereupon until it reaches and latches onto the pintle 22. Thus, the platform 20 assists in the "finding" of the pintle 22 by the hitch.

The FIG. 1 presentation of the prior art pintle assemblies graphically illustrates the appreciably elevated center of gravity disposed for a trailer hitch. The prior art pintle assemblies project from the raised bed frame of the prime mover. In contrast, my novel pintle assembly 10 is suspended nearer to ground level, to provide for a low center of gravity. In fact, my assembly 10 is rotatable on axis 26, with respect to ground level, on a lower elevation than the rotary axis of the wheels of the prime mover; the disparity D in these axes is shown in FIG. 2. This provisioning militates against inadvertent "roll-over" of the trailer.

In the preferred embodiment of my invention, I teach the pivotal mounting of the shaft 18 in parallel members 12. Thus, as shown in FIG. 6, I mount shaft 18 in sleeve bearings 32, and secure the ends of the shaft with washers 34 and pins 36. Other embodiments of my invention will occur to those skilled in the art, however. For instance, the shaft 18 could be fixed in members 12, and the platform 20 could be pivotally mounted on the shaft. Therefore, while I have described my invention in connection with a specific embodiment thereof, it is to be clearly understood that this is done only by way of example and not as a limitation to the scope of my invention as set forth in the objects thereof and in the appended claims.

I claim:

1. For use in combination with a wheeled prime mover, a pintle assembly for a trailer coupling hitch, comprising:
   platform means for slidably receiving a trailer coupling hitch thereupon; and
   means for mounting said platform means in pivotable suspension from said prime mover; wherein
   said mounting means includes a transversely extending shaft for connection to said prime mover;

said platform means pivotable about the longitudinal axis of said shaft includes a platform having opposed lower and upper planar surfaces;
said shaft lies in a horizontal plane; and
said mounting means and said platform means are cooperative to cause said platform normally to lie at an acute angle, with respect to the horizontal, to dispose at least said upper surface at said angle for a sliding engagement of said upper planar surface by a trailer coupling hitch, and further including
a pintle secured to said platform, and extending perpendicularly from said platform from only said upper planar surface, for hitching engagement therewith by a trailer coupling hitch.

2. The assembly, according to claim 1, wherein:
said mounting means further include rigid support members fixed to said prime mover in spaced-apart relationship; and
said shaft is supported by said members.

3. The assembly, according to claim 2, wherein:
said shaft is rotatable relative to said support members.

4. The assembly, according to claim 1, wherein:
said shaft is disposed across the surface of said platform which is opposite said upper planar surface.

5. The assembly, according to claim 4, wherein:
said shaft is coupled to said opposite surface;
said shaft defines, to either sides thereof, leading and trailing portions of said platform relative to normal directions of movement of said prime mover; and
said trailing portion of said platform comprises a weight which is greater than said leading portion's weight.

6. The assembly, according to claim 1, wherein:
said shaft and said platform have a given axis of rotation; and
said pintle is secured to said platform in a position displaced from said axis.

7. The assembly, according to claim 1, wherein:
said shaft is coupled to and across said platform;
said shaft defines, to either sides thereof, leading and trailing portions of said platform relative to normal directions of movement of said prime mover; and
said trailing portion of said platform comprises a dimension and weight which are greater than said leading portion's dimension and weight.

* * * * *